(12) United States Patent
Briggs et al.

(10) Patent No.: US 8,857,380 B2
(45) Date of Patent: Oct. 14, 2014

(54) VETERINARIAN COLLARS

(75) Inventors: Raymond Anthony Briggs, Berkshire (GB); Ivan Robert Crotaz, Berkshire (GB); Ian Trevor Dampney, Middlesex (GB); Andrew John Harris, Camberley (GB)

(73) Assignee: Bonovate Limited, Surrey (GB)

( * ) Notice: Subject to any disclaimer, the term of this patent is extended or adjusted under 35 U.S.C. 154(b) by 0 days.

(21) Appl. No.: 13/703,227

(22) PCT Filed: Jun. 16, 2011

(86) PCT No.: PCT/GB2011/000900
§ 371 (c)(1),
(2), (4) Date: Dec. 10, 2012

(87) PCT Pub. No.: WO2011/157991
PCT Pub. Date: Dec. 22, 2011

(65) Prior Publication Data
US 2013/0074784 A1    Mar. 28, 2013

(30) Foreign Application Priority Data

Jun. 16, 2010  (GB) .................................. 1010036.0
Mar. 31, 2011  (GB) .................................. 1105417.8

(51) Int. Cl.
*A01K 15/04*   (2006.01)
*A01K 13/00*   (2006.01)
*A61D 9/00*    (2006.01)

(52) U.S. Cl.
CPC ................ *A01K 13/006* (2013.01); *A61D 9/00* (2013.01)

USPC ............ 119/815; 119/814; 119/855; 119/856

(58) Field of Classification Search
CPC ..... A01K 13/006; A01K 27/001; A61D 9/00; A61D 3/00
USPC ......... 119/712, 814, 815, 837, 856, 863, 821, 119/855, 850, 654, 715, 865; D30/144, 152
See application file for complete search history.

(56) References Cited

U.S. PATENT DOCUMENTS

| 3,013,530 A |   | 12/1961 | Zeman |
| 6,044,802 A | * | 4/2000  | Schmid et al. ................. 119/856 |
| 6,227,148 B1 | * | 5/2001 | Wexler .......................... 119/837 |

(Continued)

FOREIGN PATENT DOCUMENTS

| DE | 19629581    |     | 1/1998  |
| WO | 9522891     | A1  | 8/1995  |
| WO | 2011157991  |     | 12/2011 |

OTHER PUBLICATIONS

Printout from Espace.com showing that EP 0 749 271 (mentioned in instant application's specification) is published under WO 95/22891 (previously cited in IDS), 1 page.

(Continued)

*Primary Examiner* — Andrea Valenti
(74) *Attorney, Agent, or Firm* — Westman, Champlin & Koehler, P.A.

(57) ABSTRACT

The invention provides a veterinarian collar in the form of a truncated cone that address the drawbacks of conventional cone-shaped collars. Alternatives are described for forming the collar from a single piece of plastics sheet.

7 Claims, 3 Drawing Sheets

(56) References Cited

U.S. PATENT DOCUMENTS

| | | | |
|---|---|---|---|
| 7,523,720 B1* | 4/2009 | Lecy et al. | 119/832 |
| 7,975,656 B2* | 7/2011 | Prill | 119/850 |
| 2003/0150401 A1* | 8/2003 | Schmid et al. | 119/815 |
| 2003/0192244 A1* | 10/2003 | Weder et al. | 47/72 |
| 2008/0223312 A1 | 9/2008 | Trescott | |
| 2010/0024745 A1 | 2/2010 | Harlow | |

OTHER PUBLICATIONS

International Search Report for International Application No. PCT/GB2011/000900, filed Jun. 16, 2011. 5 pgs.

* cited by examiner

VETERINARIAN COLLARS

CROSS-REFERENCE TO RELATED APPLICATION

This Application is a Section 371 National Stage Application of International Application No. PCT/GB2011/000900, filed Jun. 16, 2011 and published as WO 2011/157991 A2 on Dec. 22, 2011, in English, the contents of which are hereby incorporated by reference in their entirety.

FIELD OF THE INVENTION

This invention relates to veterinarian collars and, more particularly, to collars fitted to animals to prevent contact with veterinarian treatment sites

BACKGROUND TO THE INVENTION

Veterinarian collars are widely used to prevent an animal licking or scratching a site subject to, or in need of, veterinarian treatment.

One example of an existing veterinarian collar is an Elizabethan collar, an example of which is sold under the trade mark BUSTER and comprises a to cone-like structure formed from a section of plastics sheet. The narrow end of the cone fits around the animal's neck, the cone flaring forwardly and outwardly from the neck.

To be effective the cone must be sufficient in size so that the forward edge projects beyond the animal's snout. In the case of larger animals, or those with longer snouts, this means that, at its maximum, the width of the cone is considerably wider than the animal. Thus an animal wearing the collar will often experience considerable discomfort and will often contact its surroundings with the collar. The discomfort to the animal is exacerbated by the fact that the cones are typically formed from an opaque or semi-opaque material which interferes with the animal's vision.

It is an object of the invention to provide a veterinarian collar which will go at least some way in addressing the problem set forth above; or which will at least offer a novel and useful choice.

SUMMARY OF THE INVENTION

In one aspect the invention provides a veterinarian collar having a rear edge and a forward edge; said collar having a first part flaring outwardly about a central axis from said rear edge to a transition; and a second part extending from said transition to said forward edge, wherein the included angle between said first part and said central axis is greater than the included angle between said second part and said central axis.

Preferably said first part is cone-shaped.

The second part may comprise a substantially cylindrical section projecting from the cone-shaped first part or may be formed by a plurality of facets arranged about the cone-shaped first part.

Preferably said facets are substantially planar, the planes being arranged substantially parallel to said central axis.

In an alternative embodiment, said second part is substantially cylindrical and Is said first part is defined by inwardly folding substantially triangular tabs extending rearwardly from said transition.

Preferably said front edge is spaced a distance x along the central axis from said rear edge, said transition being spaced from said rear edge by 0.4x to 0.8x.

Preferably said transition is spaced from said rear edge by 0.45x to 0.67x.

Preferably said collar is formed from substantially transparent plastics material.

In a second aspect the invention provides a sheet component for the formation of a veterinarian collar, said sheet component having a first arcuate part foldable into a frusto-conical section; and a plurality of flap pieces projecting from one edge of said arcuate part.

In a third aspect the invention provides a sheet component for the formation of a veterinarian collar, said sheet component having a substantially rectangular part foldable into a cylinder and a plurality of substantially triangular flaps extending from an edge of said rectangular part such that, when said rectangular part is formed into a cylinder, said substantially triangular parts to can be folded and combined into a frusto-conical section.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

One working embodiment of the invention will now be described with reference to the accompanying drawings in which.

DETAILED DESCRIPTION OF WORKING EMBODIMENT

Figure 1:
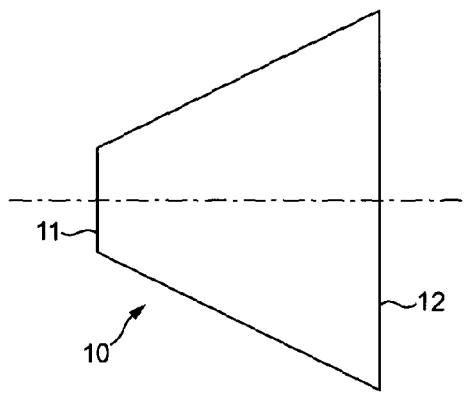
FIG. 1: shows a side view of a prior art veterinarian collar.

The invention provides an alternative to the well-known Elizabethan veterinarian collar, one example of which is described in European Patent 0 749 271 and sold with reference to the trade mark BUSTER. As can be seen in FIG. 1, this form of collar 10 is essentially frusto-conical in form, flaring forward and outwardly from the narrow or rear edge 11 which fits about the animal's neck. Since the forward edge 12 must overlie the outer extremity of the animal's snout, this invariably means that the collar also extends to a considerable extent beyond the animal's lateral extremities as well as extending to a considerable extent in a vertical plane. As a consequence an animal wearing such a collar will inevitably collide with its surroundings, often causing damage both to itself and to the surroundings.

Figure 2:
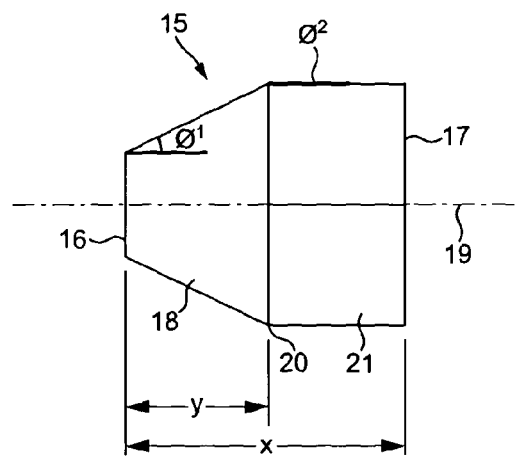
FIG. 2: shows a side view of a veterinarian collar according to the invention
Figure 3:
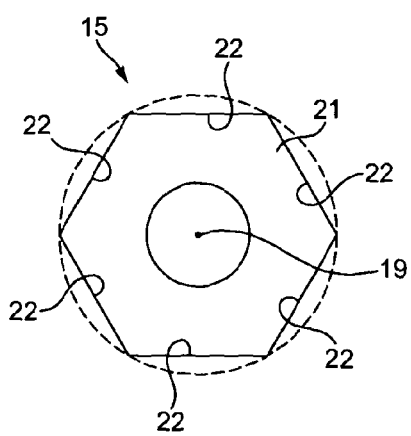
FIG. 3: shows a front view of the collar shown in FIG. 2.

Referring now to FIGS. 2 and 3, the invention provides a veterinarian collar 15 having a rear edge 16 which fits around the animal's neck, and a forward edge 17 which is intended to project beyond the forward extremity of the animal's neck. As can be seen the collar 15 has a first part 18 flaring outwardly, about a central axis 19, from the rear edge 16 to a transition 20. This part is essentially frusto-conical. A second part 21 then projects forward from the transition to the forward edge 17. The second part 21 does not flare to the extent of the first part 18 such that the included angle $\theta^1$ between said first part and said central axis is greater than the included angle $\theta^2$ between said second part and said central axis. In the form shown, $\theta^2$ is substantially 0°.

Whilst the first part 18 is preferably cone-shaped, the second part 21 may comprise a substantially cylindrical section projecting from the cone-shaped to first part or may be formed by a plurality of facets or tabs 22 arranged about the forward edge of cone shaped first part i.e. at the transition 20. If in the form of a substantially cylindrical section, the second part 21 may be provided as a separate component or vacuum formed integrally with the first part 18.

In the case of the collar depicted, the second part is defined by six facets 22 although the precise number of facets is not critical and does not form part of the invention.

As will be described in greater detail below, if the facet option is chosen, the collar may be fabricated from a single flat component and assembled into a finished collar by simple techniques. In this form the facets are substantially planar and the facets are preferably positioned and fixed so that the planes of, the facets are arranged substantially parallel to the central axis 19. It will be appreciated however that, given the flexibility of the material from which the collar is formed, when juxtaposed edges of adjacent tabs are attached together to constitute the second part 21, the individual or tabs 22 will assume a degree of curvature as shown in dotted outline in FIG. 3.

The position of the transition 20 will depend on the physiology of the animal to which the collar is intended to be fitted. The longer the snout the more rearward the position of the transition relative to the central axis 19. Referring to FIG. 2, in the case of dogs, if the front edge is spaced a distance x along the central axis from said rear edge and the transition 20 is spaced a distance y along the central axis from the rear edge, y will generally lie in the range 0.4x to 0.8x and, more preferably, in the range 0.45x to 0.67x.

We have found that that this configuration of collar provides a good working compromise between providing clearance about the ears and eyes of the animal, and limiting the outward projection of the collar.

Given that an animal's (and particularly a dog's) vision is essentially peripheral, we have also observed that the opaque nature of existing collars can lead to distress when worn. With this in mind, a collar according to the invention is preferably formed from substantially transparent plastics material. We have found 0.75 mm PETG to be particularly suitable. Other suitable materials include clear gloss polypropylene sheet, of 0.8 mm thickness, sold under the trade mark EPLAK and available from Pyramid Display Materials Limited of Manchester, UK.

Figure 4:
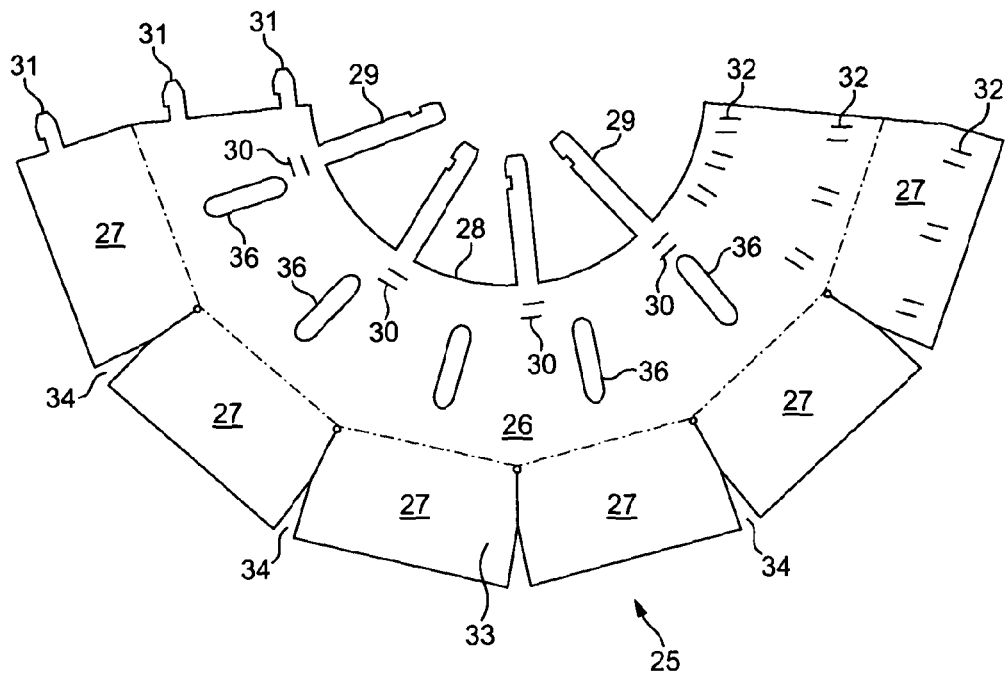
FIG. 4: shows a flat sheet component suitable for forming the veterinarian collar shown in FIGS. 2 & 3.

Referring now to FIG. 4, the invention further provides a sheet component 25 for the formation of the veterinarian collar described above. As can be seen the component 25 has a first arcuate part 26 foldable into a frusto-conical section; and a plurality of flap pieces 27 projecting from one edge of said arcuate part 26 which combine to define a plurality of facets or tabs.

The inner edge 28 of the arcuate part 26, when folded, defines the rear edge 16 of the collar. Tabs 29 projecting from the edge 28 can be folded and engaged in adjacent slots 30 to define loops through which a conventional dog collar can be threaded to retain the collar in position about the animal's neck. Alternatively, spaced slots (not shown) could be provided longitudinally of somewhat wider and shorter tabs 29 through which a conventional dog collar could be threaded.

The overall shape of the collar, is maintained by engaging lateral tabs 31 in slots 32. As can be seen three sets of slots 32 are provided to allow the collar to be assembled into three different diameters.

The flap pieces 27 are defined in that part 33 of the component 25 which, when folded into the collar, defines the second part 21. As can be seen the flaps are arranged in an arcuate array with radially extending cuts 34 defined between each juxtaposed flap piece 27. Once the arcuate part 26 has been folded and the tabs 31 and slots 32 engaged to define the first frusto-conical part 18, the flap pieces 27 are folded inwardly so that juxtaposed edges of adjacent flap pieces 27 overlap as shown at 35 in FIG. 5. In the form shown these overlapped edges are then fixed together by rivets 36 but could, for example, also be fixed together by welding, gluing or other suitable fixing methods.

Figure 5:
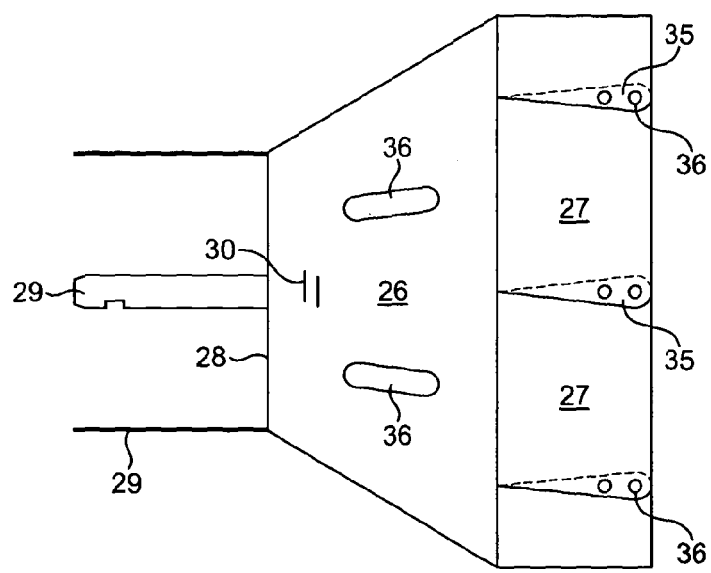
FIG. 5: shows a more detailed view of a collar formed from the component shown in FIG. 4.

A further feature of the veterinarian collar shown in FIGS. 4 and 5 is the provision of ventilation slots 36 in the first part 26 to allow air circulation about the animals ears when the collar is in use.

Figure 6:
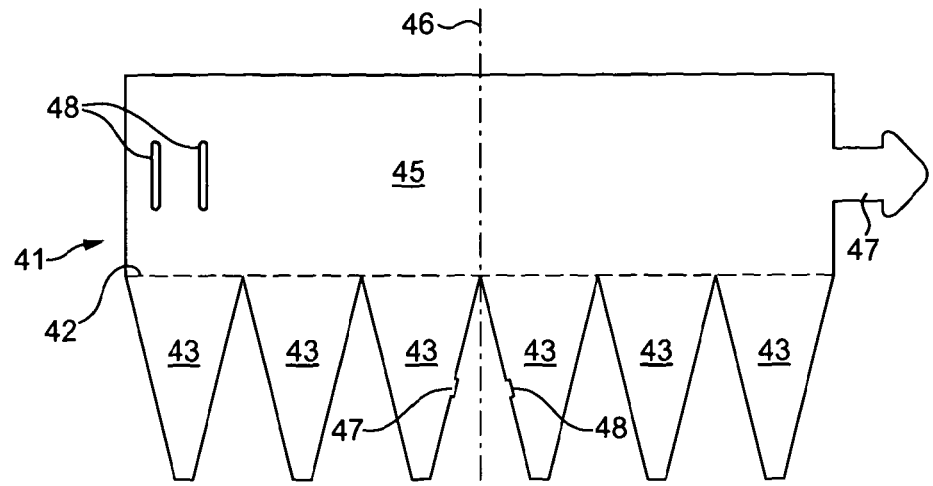
FIG. 6: shows a flat sheet component for forming an alternative embodiment of collar according to the invention.
Figure 7:
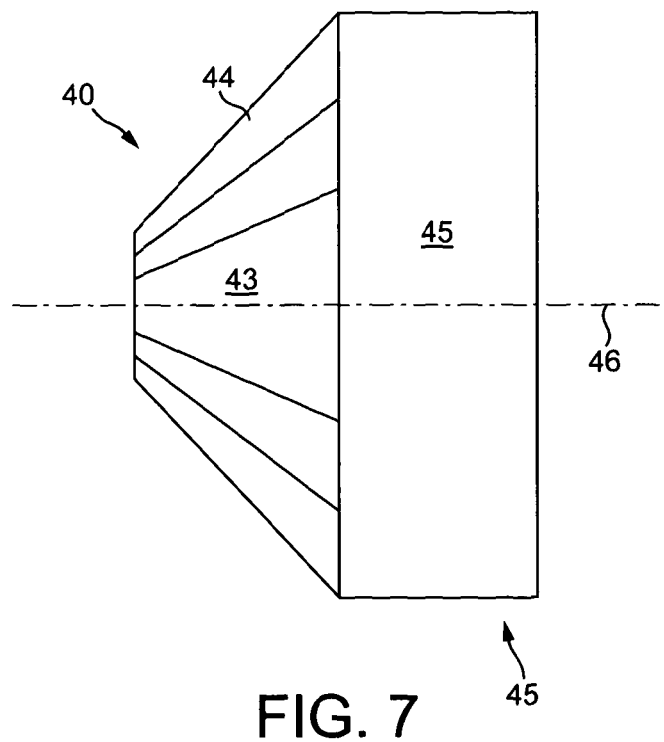
FIG. 7: shows a collar formed from the component shown in FIG. 6.

Turning now to FIGS. 6 & 7, an alternative embodiment of collar 40 according to the invention can be formed from a blank component 41. The dotted line 42 in FIG. 6 indicates a transition from one side of which a plurality of triangular tabs or flaps 43 extend. In a manner which will be described in greater detail below, these combine to define the first part 44 of the collar which engages about the animal's neck. To the other side of the transition 42, extends a plain substantially rectangular section which folds to define a substantially cylindrical second part 45.

To form the collar, the section 45 is folded into a cylinder about central axis 46. Fixing tab 47 is then engaged in slots 48 to maintain the cylindrical form. Extra spaced sets of slots 48 may be provided to allow variation in the diameter of the assembled collar.

With the second part formed, the triangular tabs 43 are then folded inwardly and fixed together to define the first part 44. Adjacent tabs 43 can be fixed together by providing interlocking fixings on juxtaposed edges. By way of example only, an edge of one flap 43 could have a projection 47 while the juxtaposed edge of the adjacent flap could include a slot 48 such that, when the flaps are folded down the projection 47 could engage in the slot 48. With a similar arrangement being provided between all flaps, the cone-shape of the first part 44 can be maintained. The function of the projections 47 and slots 48 could be supplemented by, or even replaced by, a layer of adhesive tape or adhesive material wound around the first part 44.

Many alternatives to the projection/slot arrangement will present themselves to those skilled in the art and the precise means for maintaining the cone configuration is not an essential feature of the invention.

Not shown in FIGS. 6 & 7 is an arrangement for fixing the collar about the animal's neck. Again any suitable arrangement can be adopted including (but not restricted to) slots in the tabs 43 through which a conventional collar could be passed, and additional locking tabs projecting from the outer extremities of the tabs 43 which could be looped around a conventional collar. Further, the flaps 43 could be provided with cut-outs which, in the assembled collar provide circulation slots equivalent to the slots 36 shown in FIG. 5. It will thus be appreciated that the invention provides a simple yet effective form of veterinarian collar which is simple in form, provides coverage about the snout, yet projects to a far lesser extent than existing collars and, as a s consequence, causes far less stress both to an animal wearing the collar, and to its surroundings.

The invention claimed is:

1. A veterinarian collar having a rear edge and a forward edge; said collar having a cone-shaped first part flaring outwardly about a central axis from said rear edge to a transition; and a second part extending from said transition to said forward edge, wherein the included angle between said first part and said central axis is greater than the included angle between said second part and said central axis; wherein said collar is formed from a single section of transparent plastic sheet material; and wherein said front edge is spaced a distance x along the central axis from said rear edge, said transition being spaced from said rear edge by 0.45x to 0.8x, wherein the forward edge creates an opening allowing an animal to eat and drink while wearing said collar, wherein said first part secures around an animal's neck.

2. A collar as claimed in claim 1 wherein said second part comprises a substantially cylindrical section projecting from the cone-shaped first part or is formed by a plurality of facets arranged about the cone-shaped first part.

3. A collar as claimed in claim 2, wherein said facets are substantially planar, the planes being arranged substantially parallel to said central axis.

4. A collar as claimed in claim 1 wherein said second part is substantially cylindrical and said first part is defined bye inwardly folding substantially triangular tabs extending reawardly from said transition.

5. A collar as claimed in claim 1 wherein said transition is spaced from said rear edge by 0.5x to 0.67x.

6. A collar as claimed in claim 1, said sheet material having a first arcuate part foldable into a frusto-conical section; and a plurality of flap pieces projecting from one edge of said arcuate part.

7. A collar as claimed in claim 1, said sheet material having a substantially rectangular part foldable into a cylinder and a plurality of substantially triangular flaps extending from an edge of said rectangular part such that, when said rectangular part is formed into a cylinder, said substantially triangular parts can be folded and combined into a frusto-conical section.

* * * * *